United States Patent
Puente Fernandez

(10) Patent No.: US 9,434,356 B1
(45) Date of Patent: Sep. 6, 2016

(54) WINDSHIELD WIPER AND RADIATOR FLUID REFILL DEVICE

(71) Applicant: Roberto Rafael Puente Fernandez, Miami, FL (US)

(72) Inventor: Roberto Rafael Puente Fernandez, Miami, FL (US)

( * ) Notice: Subject to any disclaimer, the term of this patent is extended or adjusted under 35 U.S.C. 154(b) by 0 days.

(21) Appl. No.: 14/668,855

(22) Filed: Mar. 25, 2015

(51) Int. Cl.
   *B60S 1/50* (2006.01)
   *B62D 25/08* (2006.01)
   *B67C 11/02* (2006.01)

(52) U.S. Cl.
   CPC .............. *B60S 1/50* (2013.01); *B62D 25/081* (2013.01); *B67C 11/02* (2013.01)

(58) Field of Classification Search
   CPC ........ B60S 1/50; B62D 25/081; B67C 11/02
   USPC ................ 141/86, 297, 331–345; 239/284.1; 296/192, 38, 96, 15; 220/573, 661, 220/86.2; 15/103
   See application file for complete search history.

(56) References Cited

U.S. PATENT DOCUMENTS

| | | | | |
|---|---|---|---|---|
| 2,770,017 A | * | 11/1956 | Oishei ...................... | B60S 1/48 15/250.27 |
| 3,738,575 A | * | 6/1973 | Somer ...................... | B60S 1/50 239/284.1 |
| 5,620,018 A | * | 4/1997 | Carpenter ............ | B67D 7/3209 137/312 |
| 6,266,842 B1 | * | 7/2001 | Muller .................... | B60S 1/481 15/250.01 |
| 2010/0108191 A1 | * | 5/2010 | Ernst ....................... | B67C 11/02 141/331 |
| 2013/0240419 A1 | * | 9/2013 | Carroll .................... | B60S 1/48 210/95 |

* cited by examiner

*Primary Examiner* — Mark A Laurenzi
*Assistant Examiner* — Timothy P Kelly
(74) *Attorney, Agent, or Firm* — David P. Lhota, Esq.; Lhota & Associates, P.A.

(57) ABSTRACT

An automobile windshield wiper fluid refill device having a collection tray that mounts under a hood of a vehicle, collects rain water and directs it to a washer fluid container to automatically fill the container. The tray has a bottom surface and wall that projects upward from the bottom surface and extends around the sides and front of the tray and terminates near the back end of the tray to define an opening and a pair of drainage ports partially defined by apertures in the wall and a pair of conduits depending from the wall proximal the apertures. The open side of the tray and wall ends engage a wall or drainage plastic piece under the hood of a vehicle when mounted. A flange extends from the bottom surface through the opening for fitting under a plastic drainage piece that all vehicles have under the hood for draining rain water and other water. The fluid refill device has a first tube that connects a first drainage port to a wiper fluid refill device for refilling the wiper fluid refill device and a second tube that connects a second drainage port to a radiator for refilling a radiator with water.

8 Claims, 6 Drawing Sheets

WINDSHIELD WIPER AND RADIATOR FLUID REFILL DEVICE

CROSS-REFERENCE TO RELATED APPLICATION n/a

STATEMENT REGARDING FEDERALLY SPONSORED RESEARCH OR DEVELOPMENT

N/A

FIELD OF THE INVENTION

The present invention relates to a windshield wiper fluid refill system, and in particular, to windshield wiper fluid refill device that collects rain water and redirects it to the windshield washer fluid container under the hood to fill or refill the container with natural water and without having to open the hood.

BACKGROUND OF THE INVENTION

Windshield wiper systems consists of windshield wipers, a motor, spray nozzles a container under the hood for holding washer fluid to clean dirt and debris off a windshield. Washer fluid typically includes chemicals such as methonal, ethanol, ethylene glycol or anti-freeze which can be harmful if swallowed, breathed in or splashes in the eyes. These chemicals are also not eco-friendly, ecological or environmentally desirable. Lastly, at certain times year or in certain locations the windshield requires frequently cleaning such that the washer fluid has to be frequently replaced which cost money and is not necessarily economical. Every vehicle has a plastic piece under the hood for draining rain and other water that redirects water to the sides of the vehicle or under the vehicle. However, no devices are known that collect and direct rain water to automatically refill a windshield washer fluid container without opening the hood. If a system existed that collected rain water and redirected it to the washer fluid container to fill the container it would provide an eco-friendly, ecological and environmentally safe alternative to the use of washer fluids having harmful chemicals. It would also provide a convenient and safe device or system for vehicle owners and operators since the container would automatically fill the container without even having to lift the hood. Lastly, it would provide an inexpensive alternative to having to pay for expensive washer fluids and periodically having to them.

Various systems are known that redirect rain water but they are not designed for automobile windshield washer systems. For instance, U.S. Pat. No. 8,539,718 issued to Ziegler discloses a rain catch that collects and diverts rainwater from the perimeter of a retractable awning having an awning canopy that is tilted so as to have a lowest corner. The rain catch has a body that includes a body cavity and an awning beam collar, the body cavity having an opening that receives rainwater flowing off the lowest corner of the awning canopy. U.S. Pat. No. 6,009,672 issued to Kuhns discloses a water collector for directing water from roofing configurations that form an inside valley to the rain gutters is disclosed. U.S. Pat. No. 5,385,162 issued to Wu discloses an umbrella that includes a plurality of telescopic sleeves telescopically extendibly and retractibly mounted on an umbrella shaft covered with umbrella cloth, a water collector secured on a tip portion of the umbrella communicating with interior of the telescopic sleeves for collecting rain water drained from the umbrella cloth, and a drain valve slidably held on the water collector and operatively pushed by an innermost or smallest sleeve for automatically closing a plurality of drain holes formed in a lower portion of the water collector to prevent unexpected dripping of the rain water as stored in the collector for hygienic purpose. U.S. Pat. No. 4,732,037 issued to Daube, Jr. et al. discloses an automated rain water collector to collect a plurality of successive rain water samples, comprised of a reservoir into which rain water is collected and discharged, and a motor-driven turntable which holds a plurality of sample bottles. U.S. Pat. No. 4,936,622 issued to Yamauchi et al. discloses a sliding panel which closes an opening formed in an automobile roof that can be placed inside the roof to open the opening. A rain channel is located below the rear end of the opening when the opening is closed, to accept incoming water. The channel is placed inside the roof together with the panel. The channel moves relative to the panel in a direction opposite to the direction of movement of the panel inside the roof, for reducing the space needed to accommodate the panel.

The foregoing patents fail to disclose a system that collects rain water and redirects it to the washer fluid container to fill the container without having to open the hood. It is therefore desirable to have a system that collects rain water and automatically refills the washing fluid container as it would provide an eco-friendly, ecological and environmentally safe as well as a convenient and humanly safe alternative to the use of washer fluids having harmful chemicals. Such a system would also provide an inexpensive alternative to having to pay for expensive washer fluids and periodically having to them. If there existed such a device it would address the shortcomings in the background art along with the aforementioned benefits. As there are no known devices that fulfill these needs and have these specifications, there exists a need for such a device. It is, therefore, to the effective resolution of the aforementioned problems and shortcomings of the prior art that the present invention is directed. The instant invention addresses this unfulfilled need in the prior art as contemplated by the instant invention disclosed.

SUMMARY OF THE INVENTION

In light of the foregoing, it is an object of the present invention to provide a device for automobiles that collects rain water and directs it automatically into the windshield washer fluid container under a hood.

It is an object of the present invention to provide a device for automobiles that collects rain water and directs it automatically into the radiator fluid container or radiator.

It is also an object of the instant invention to provide a windshield wiper fluid refill device that refills a washer fluid container with rain water and without having to lift the hood.

It is another object of the instant invention to provide a windshield wiper fluid refill device that can be designed to accommodate different types of automobiles and models.

It is an additional object of the instant invention to provide a windshield wiper fluid refill device that is eco-friendly and environmentally safe.

It is a further object of the instant invention to provide a windshield wiper fluid refill device safe for use by the owner or operator of a vehicle.

It is yet another object of the instant invention to provide a windshield wiper fluid refill device that obviates the need for purchasing packaged windshield wiper fluids especially those with chemicals.

It is yet a further object of the instant invention to provide a windshield wiper fluid refill device that is economical.

It is yet an additional object of the instant invention to provide a windshield wiper fluid refill device that may also be used to fill a radiator with water.

In accordance with one aspect of the instant invention, the present invention provides an automobile windshield wiper fluid refill system wherein rain water is directed from the windshield into the window washer fluid container. The window washing container receives the water and stores it for use in cleaning the windows. Consequently, the container is always full and is automatically filled without having to open the hood.

In accordance with another aspect of the instant invention, the automobile windshield wiper fluid refill device provides a collection tray that mounts under a hood of a vehicle. The tray has a bottom surface and a wall that projects upward from the bottom surface and extends around the front and sides of the tray and terminates near the back of the tray to define an opening between the ends of the wall. The open side of the tray mounts against a wall or plastic piece under the hood of a vehicle. The bottom surface may also have a flange or lip extending through the opening for fitting under an accompanying plastic drainage piece that all vehicles have under the hood for draining rain water and other water. The tray of the instant invention has at least one preferably a pair of drainage ports to drain collected water and redirecting the collected water to the washer fluid container. A tube connects to the drainage port at one end to the washer fluid container or the container cap at the other end. A tube may be connected to each port at one end and to the washer fluid container or cap at the other end via a T connector or adapter that fluidly communicates the tubes with the container through a common leg of the T connector. In an alternative embodiment, a tube may be connected to a drainage port at one end and to a radiator or radiator refill container at the other end to direct automatically rain water or other sources of water to the radiator ensuring it has a constant supply of water.

In accordance with these and other objects, which will become apparent hereinafter, the instant invention will now be described with particular reference to the accompanying drawings.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
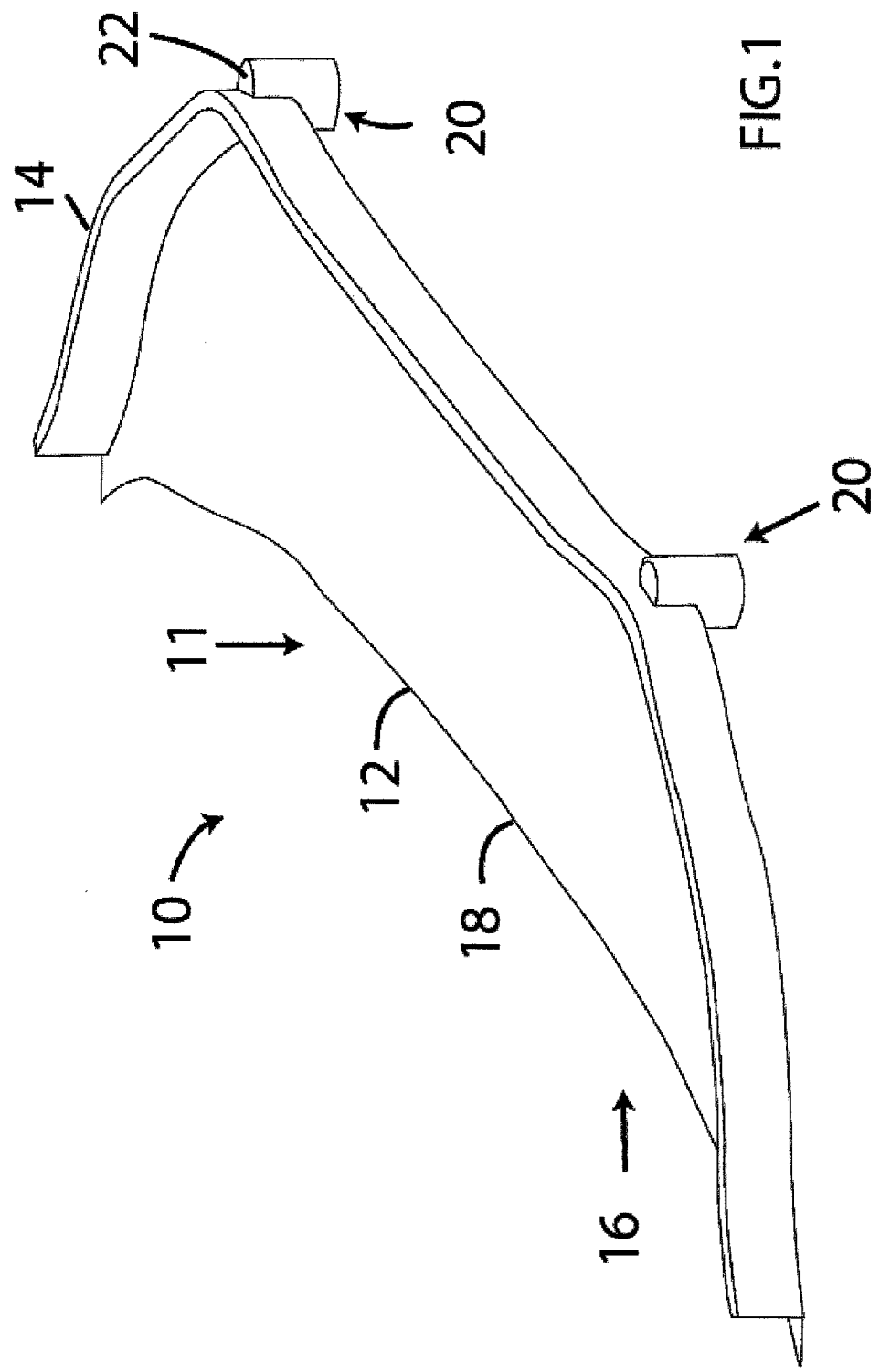
FIG. 1 is a top perspective view of the windshield wiper fluid refill device of the present invention.
Figure 2:
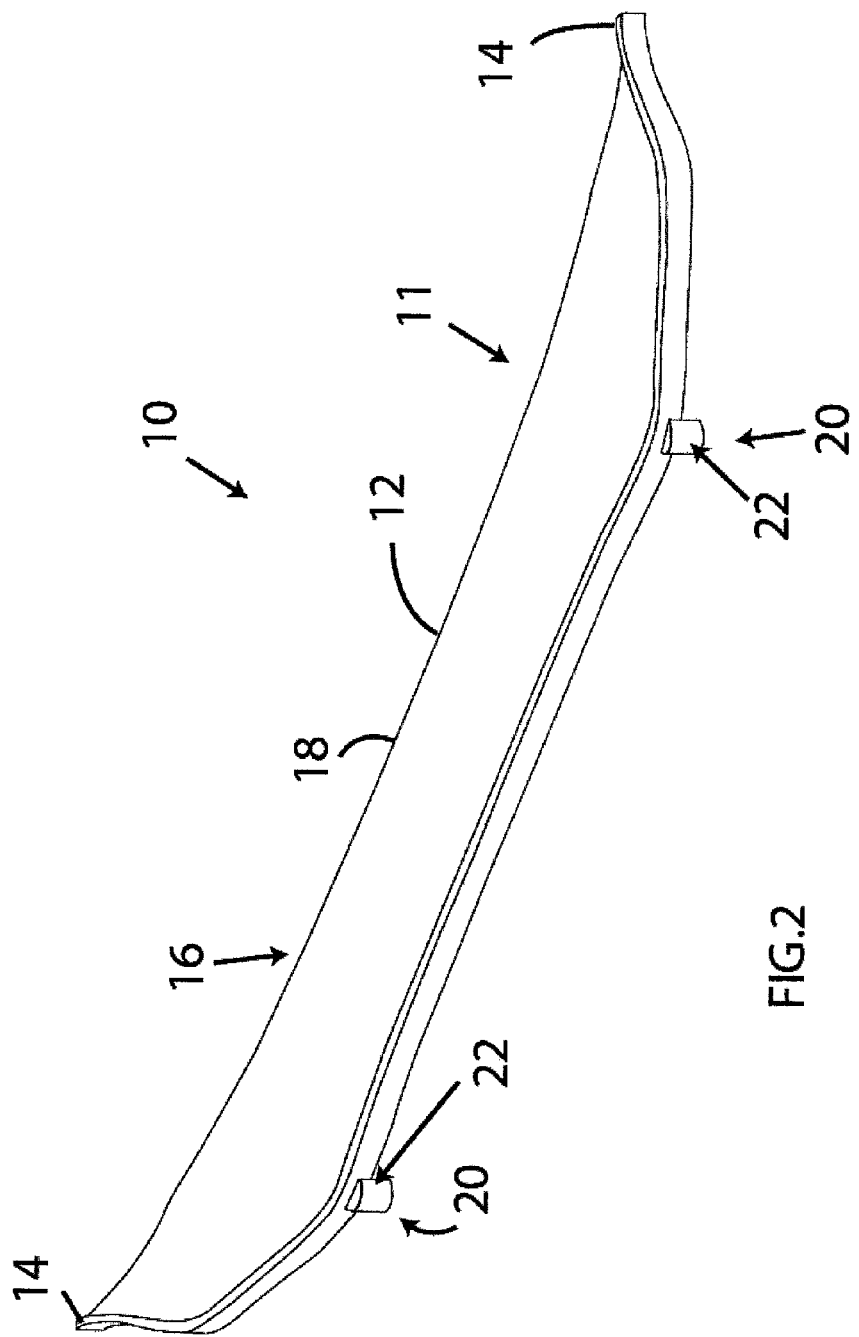
FIG. 2 is a front perspective view of the windshield wiper fluid refill device of the present invention shown in FIG. 1.
Figure 3:
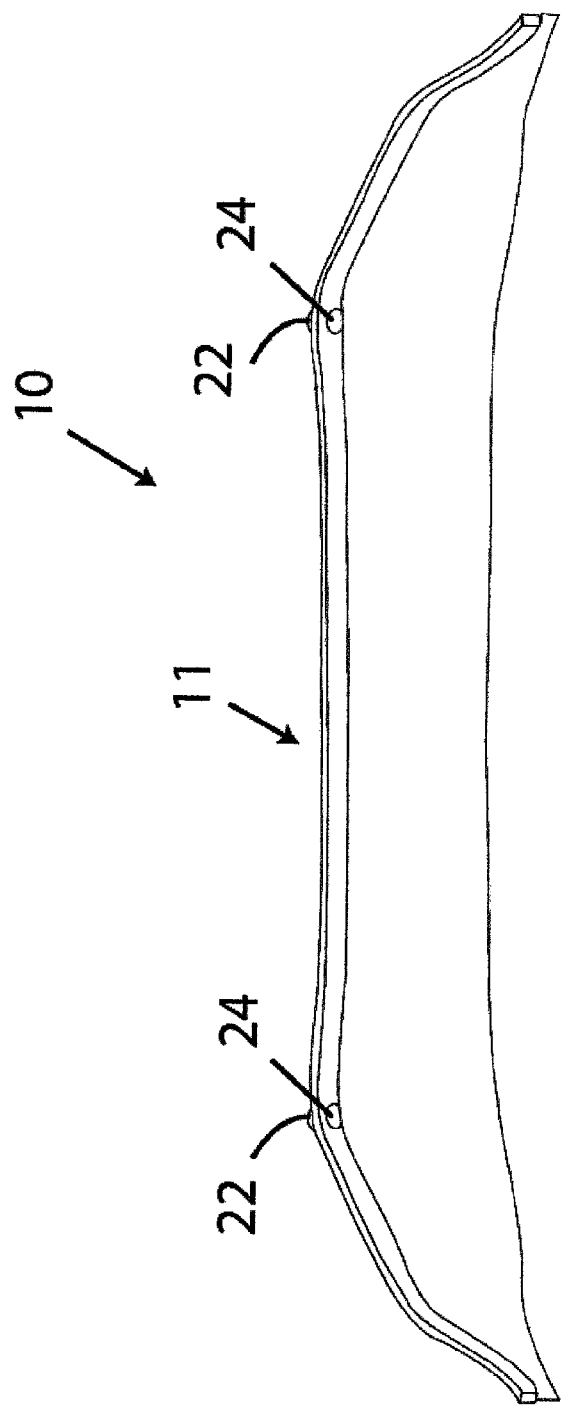
FIG. 3 is a rear perspective view of the windshield wiper fluid refill device FIG. 1 in accordance with the present invention.
Figure 4:
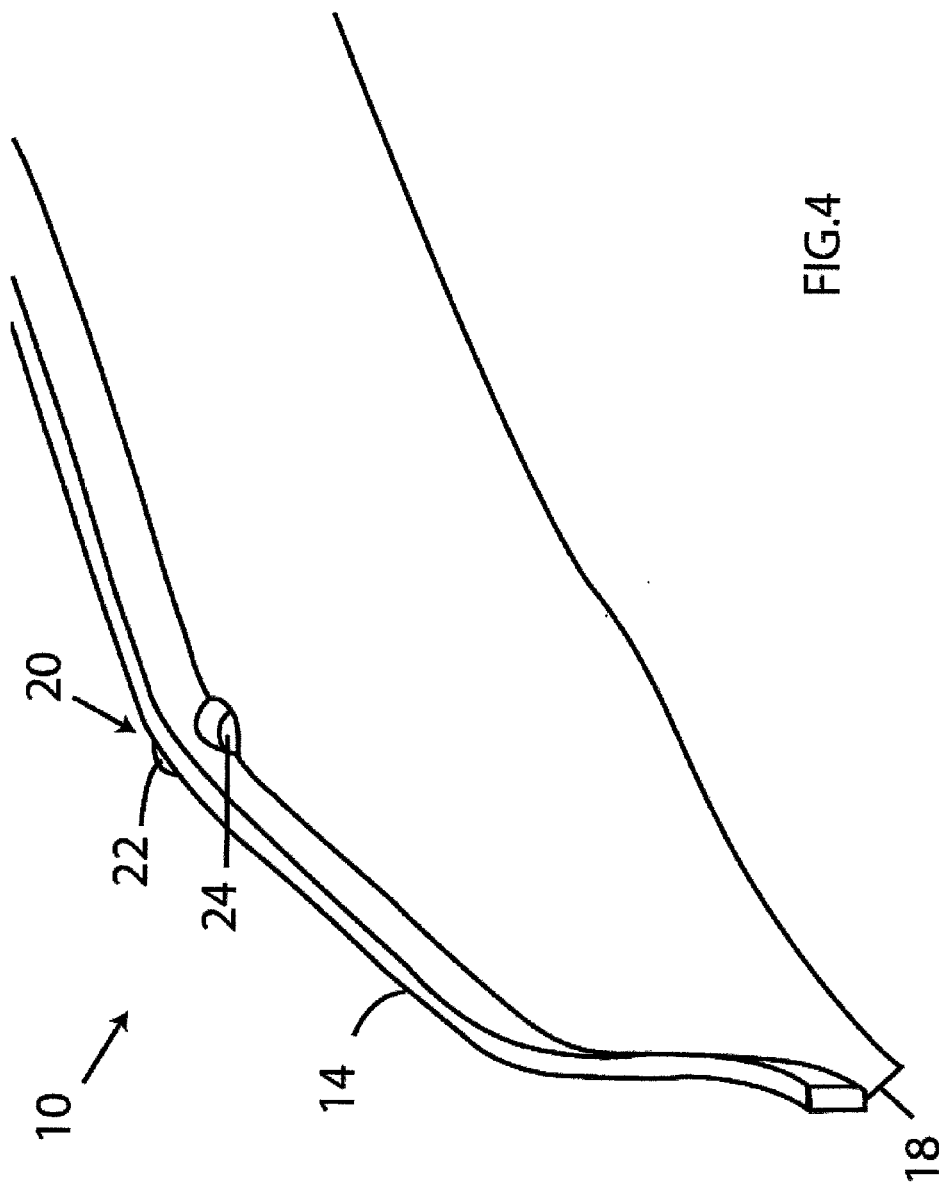
FIG. 4 is a partial perspective view of the windshield wiper fluid refill device of FIG. 1 in accordance with the present invention.
Figure 5:
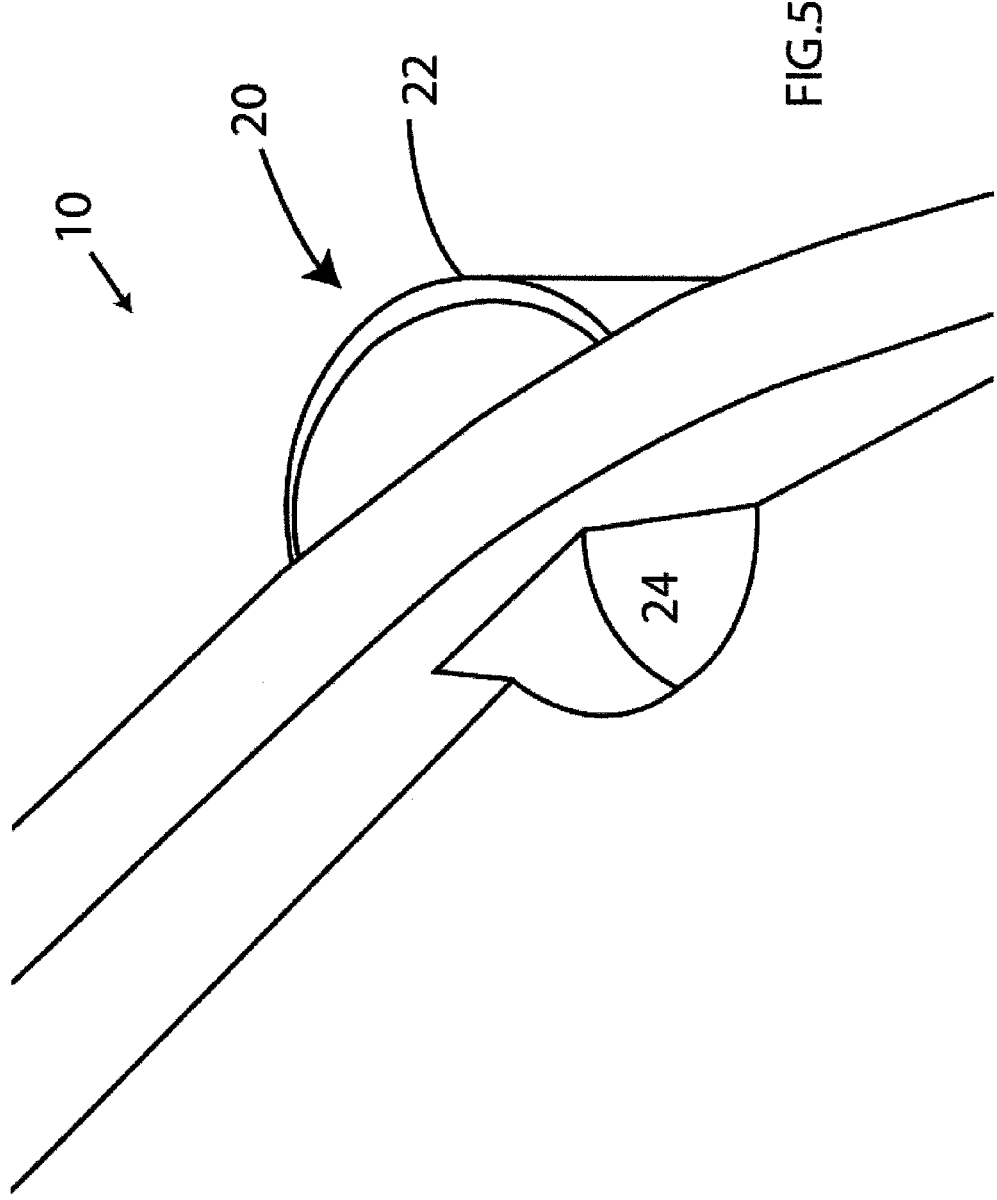
FIG. 5 is expanded partial view of the windshield wiper fluid refill device of FIG. 1 illustrating a water drainage port in accordance with the present invention.

With reference to the drawings in which like reference designators refer to like elements, FIGS. 1 to 6 depict the preferred and alternative embodiments of the instant invention which is generally referenced as a windshield washer or wiper fluid refill device, washer fluid refill device or system and, or by numeric character 10. Referring to FIGS. 1-2, the windshield washer fluid refill device 10 provides a collection tray 11 having a bottom surface 12, walls 14, opening 16, flange or lip 18 and drainage ports 20. The walls 14 project upward from the bottom surface 12 around the sides and has two ends that terminate proximal the rear portion of the tray 11. The instant invention 10 includes at least one and preferably two drainage ports 20 proximal opposite corners and sides of the tray 11. Each drainage port 20 includes a conduit 22 that depends from the bottom surface 12 and wall 14 proximal the front portion of the tray 11. The drainage ports 20 allow rain water or other water to drain and be directed to a washer fluid container. The rear portion of the tray 11 defines an opening 16 between the ends of the tray wall 14. The bottom surface 12 extends through the opening 16 past the ends of the walls 14 to define or provide a lip or flange 18.

Still referring to FIGS. 1 and 2, the open side of the tray 11 mounts against a wall or existing plastic drainage plate under the hood of a vehicle to seal off the tray 11. The flange 18 may fit under the existing drainage plate to provide a better seal. The bottom surface 12 preferably slopes downward from the opening 16 toward the drainage ports 20 and wall 14 along the front of the washer fluid refill device 10. In an alternative embodiment, the bottom surface 12 may also slope downward from the opening 16 at an angle toward the sides and each drainage port 20 to form a pitch on both sides of the tray 11. This would provide a water collection area near each drainage port 20.

Referring to FIGS. 3-6, the washer fluid refill device 10 has a drainage port 20 near the front end corners of the tray 11. Each drainage port 20 is defined by a hollow conduit 22 and aperture 24. Each conduit 22 depends downward from the tray 11 beginning at a midpoint in the wall 14. The apertures 24 are defined by openings in the tray wall 14 proximal the conduit 22 and in fluid communication with the conduit 22. The aperture 24 provides water access or an entry point to the conduit 22. Water passes through the aperture 24 and into and down the conduit 22 toward a washer fluid container 1 located under the hood of the vehicle. A tube 32 may be connected to one or both conduit 22 at one end and extended to the washer fluid container 1 for directing water into the container 1 at the other end. Connecting a tube 32 to each drainage port conduit 22 compensates for any tilt in the tray 11 so water is directed to the washer fluid container regardless of which side of the tray 11 water collects. The tube 32 is fed into or connected to the container 1 with an adapter for depositing water into the container 1. In an alternative embodiment, the tube 32 may be fed through or connected to the container cap 3 with an adaptor. A separate tube 32 may be connected to each conduit 22 wherein both tubes 32 are extended to the washer fluid container 1. If a tube 32 is connected to each drainage port conduit 22, then both tubes are preferably connected to a T-connector at the opposite end wherein the free leg of the T-connector is mounted to the container for directing water from both tubes 32 into the washer fluid container 1. Alternatively, if only one drainage port 20 is being used, a plug may be inserted into the other drainage port through the conduit 22 or aperture 24. A plug may be placed in both ports when washing the vehicle to prevent soapy water from getting into the washer fluid container 1 or radiator 2.

Figure 6:
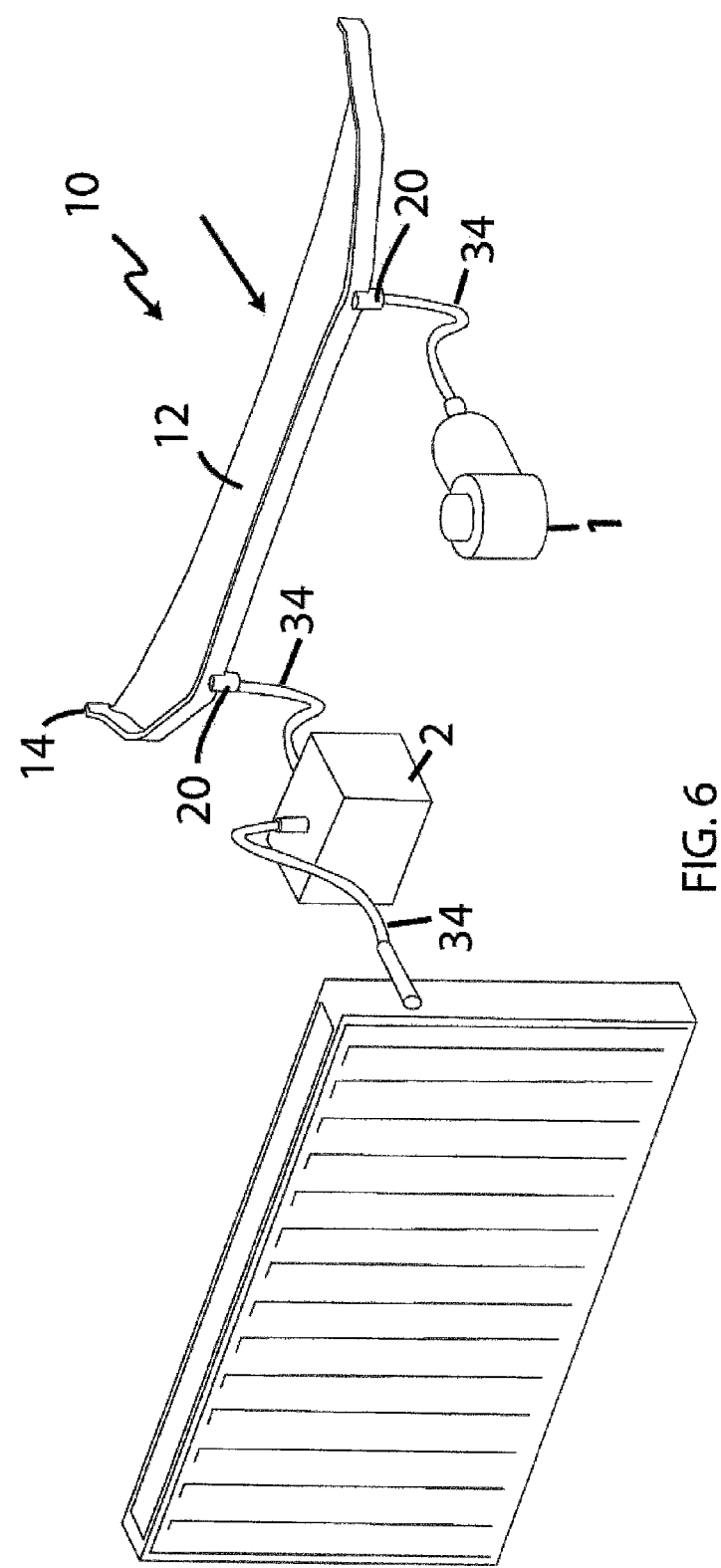
FIG. 6 is perspective view of the windshield wiper fluid refill device of FIG. 1 connecting one water drainage port to a windshield wiper fluid container with a first tube and the other water drainage port to a radiator refill container with a second tube in accordance with the present invention.

Still referring to FIG. 6, the instant invention 10 may be used for directing rain water and other exterior water sources to the radiator or radiator refill container 2. A second tube 34 is connected to one of the drainage port conduit 22 at one end and to the radiator or radiator refill container 2 at the opposite end. The second tube 34 is preferably connected to the radiator or radiator refill container 2 with an adaptor. The first tube 32 and second tube 34 may be interchanged, removed for cleaning and directed to either the washer fluid container 1 and, or radiator refill container 2 as desired.

With reference to FIGS. 1-6, the washer fluid refill device 10 is mounted under the hood of a vehicle preferably below the windshield and proximal the existing drainage plate found in most vehicles for draining rain water and other water to the sides or under the vehicle. The washer fluid refill device 10 may be mounted using metal or plastic screws, washers or plugs. The windshield washer fluid refill device 10 is preferably made from a plastic material. For instance, the instant invention 10 may be made from a thermoplastic, thermosetting polymer, polypropylene, polystyrene, polyethylene, polyvinyl chloride or other organic polymer. The material used to make the washer fluid refill device 10 is preferably environmentally safe.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An automobile windshield washer fluid refill device for mounting under the hood of an automobile, said device comprising:
   a tray having a bottom surface with a front end and a back end and sides, a wall extending upward from the bottom surface and around the sides of said tray, said wall having opposite ends that terminate proximal said back end;
   an opening defined between said opposite ends proximal said back end;
   at least one drainage port at least partially defined by an aperture in said wall proximal said front end; and
   a hollow conduit depending from said wall in fluid communication with said aperture;
   a second drainage port comprising a second aperture defined in said wall and a second hollow conduit depending from said wall in fluid communication with said second aperture; and
   a flange extending from said bottom surface through said opening between said ends of said wall.

2. The device of claim 1, wherein said bottom surface further comprises:
   the flange extending from said bottom surface through said opening between said opposite ends of said wall.

3. The device of claim 1, wherein said bottom surface pitches downward from said back end to said front end.

4. The device of claim 3, wherein said bottom surface pitches downward from said back end to said front end and towards the sides of said tray.

5. The device of claim 1, further comprising:
   a tube connectable to said drainage port, said tube being in fluid communication with said drainage port.

6. The device of claim 1, further comprising:
   a tube connectable to said hollow conduit, said tube being in fluid communication with said hollow conduit.

7. The device of claim 1, further comprising:
   a tube connectable to said hollow conduit, said tube being in fluid communication with said hollow conduit; and
   a second tube connectable to said second hollow conduit, said second tube being in fluid communication with said second hollow conduit.

8. The device of claim 7, wherein said second tube is in fluid communication with a radiator.

\* \* \* \* \*